Nov. 11, 1952 W. F. SINDELAR 2,617,277
UNIVERSAL JOINT
Filed Aug. 4, 1945 2 SHEETS—SHEET 1

INVENTOR.
WILLIAM F. SINDELAR
BY
Kwis Hudson Boughton & Williams
ATTORNEYS

Nov. 11, 1952 W. F. SINDELAR 2,617,277
UNIVERSAL JOINT
Filed Aug. 4, 1945 2 SHEETS—SHEET 2

INVENTOR.
WILLIAM F. SINDELAR
BY
Kwis Hudson, Boughton & Williams
ATTORNEYS

Patented Nov. 11, 1952

2,617,277

UNITED STATES PATENT OFFICE 2,617,277

UNIVERSAL JOINT

William F. Sindelar, Cleveland, Ohio

Application August 4, 1945, Serial No. 608,989

5 Claims. (Cl. 64—21)

The present invention relates to constant velocity, universal joints for motion transmission mechanisms.

One of the principal objects of the invention is the provision of a novel and improved universal joint, the relative angular velocity of the driving and driven members of which is constant for different angles of deflection therebetween.

Another object of the invention is the provision of a novel and improved universal joint of the character referred to in which either the driving or the driven member projects through the other.

Other objects of the invention are the provision of a novel and improved universal joint of the character referred to which will be simple and rugged in construction; can be sealed for retaining lubrication; and can be made small and compact without sacrificing ruggedness and simplicity, etc.

The invention resides in certain constructions and combinations and arrangements of parts and further objects and advantages thereof will be apparent from the following description of the preferred embodiment described with reference to the accompanying drawings forming a part of this specification in which similar reference characters designate corresponding parts, and in which Fig. 1 is a perspective view, with portions in section, of a universal joint embodying the present invention;

Figure 1:
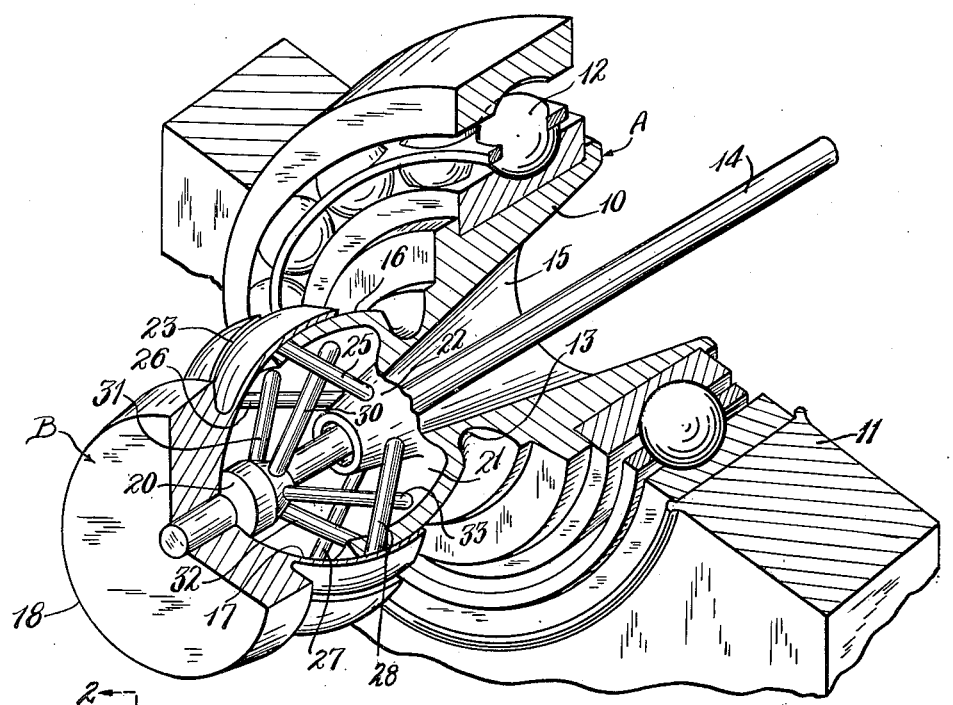

Referring to Figs. 1 to 4 of the drawings, the universal joint shown which, it is to be understood, is only illustrative of the invention, comprises two assemblies A and B, either of which may be the driving assembly or member. The assembly, other than the driving assembly is, of necessity, the driven assembly. As shown, the assembly A comprises a member 10 rotatably supported in a supporting member or frame 11 by an antifriction bearing 12. The member 10 is adapted to be connected in a motion transmission system by a pulley groove 13 formed in the circumference of a portion or section thereof immediately to the left of the bearing 12. Alternatively, the member 10 may be supported and/or connected in the motion transmission system in any suitable manner. The assembly B includes a shaft 14 projecting through a frustoconically shaped center aperture 15 in the member 10 of the assembly A.

The two assemblies A and B are operatively connected together for universal movement by a ball and socket connection comprising external and internal spherical-like surfaces 16 and 17 formed on the member 10 of the assembly A and a member or wheel 18 of the assembly B, respectively. The member 18 is fixed in any suitable manner to the shaft 14 immediately to the front or left of a collar or flange 20 on the latter. The external spherical surface 16 fits within the internal spherical surface 17 and the end of the member 18 is hollowed out, as shown, to form a recess 21 having a frusto-conically shaped boss 22 in the bottom thereof. The member 18 is preferably made of resilient material, such as spring steel hardened and tempered and the end thereof within which the spherical surface or ball 16 fits is comparatively thin-walled and provided with a plurality of slots 23 to permit assembly of the ball part of the member 10 therein. Preferably, four to six slots are employed. The slots 23 may also act as lubricant grooves. The interior spherical surface or socket 17 is preferably slightly smaller than the external spherical surface or ball 16, with the result that the spring action of the external or socket member 18 causes it to lap itself into a fit with surface 16 and eliminates all looseness between the two mating spherical surfaces, which surfaces form a bearing for the assembly B.

The driving connection between the assemblies A and B, as shown, comprises four pins 25, 26, 27 and 28 forming a part of assembly A and four pins 30, 31, 32 and 33 forming a part of the assembly B. The four pins 25 to 28 of assembly A are located within the recess 21 and extend from the left end of the member 10 to the boss 22. Opposite ends of the pins 25 to 28 are fixedly secured to the end of the member 10 and to the boss 22. One end of each of the four pins 30 to 33 of assembly B is fixed to the collar 20 and other ends thereof are unsupported. All of the pins are made of hard, wear-resistant material, such as, alloy steel hardened and ground, make equal angles $u$ with the axis of rotation of their respective assemblies, and are at equal distances $w$ from the center point $p$ of the spherical surfaces 16, 17.

Figure 3:
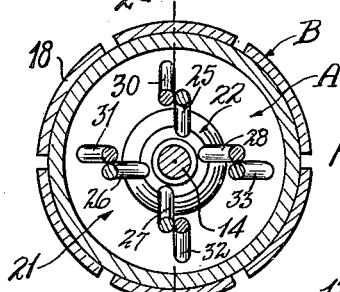
Fig. 3 is a sectional view on the line 3—3 of Fig. 2.
Figure 2:
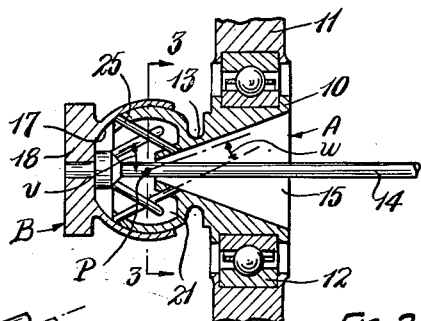
Fig. 2 is a longitudinal vertical sectional view, approximately on the line 2—2 of Fig. 3, with portions in elevation.

The angular location of the pins 25 to 28 and 30 to 33 about the axes of rotation of their respective assemblies is such that they engage and lock against each other, two pins of either assembly being interposed between two pins of the other assembly, as clearly shown in Fig. 3. The construction is such that the driving connection will function or drive in either direction. The four pins 30 to 33 of assembly B, which are preferably made of resilient material, are so connected to the collar 20 that they act like cantilever springs to exert a spring action against the mating pins on assembly A, thus compensating for any wear on the pins, eliminating axial backlash, and taking care of any interference between engaging pins because of the location of their centers on opposite sides of a radial plane through their points of contact and the center $p$. As shown, the pins are pressed into suitable apertures in the members to which they are attached and can be readily replaced, if necessary.

From the foregoing it will be apparent that the point of intersection or contact of any two mating pins will always lie on a plane $x$ bisecting the angle formed by the axis $y$ of assembly A and the axis $z$ of assembly B, thus fulfilling the requirement for constant angular velocity of the driven assembly with respect to the driving assembly. Because of the absence of any whipping action of the driven shaft, the universal joint may be operated at high speed, etc., without damage. The joint proper may be enclosed in a light metal dust shield which may also serve as a lubricant holder.

Figure 4:
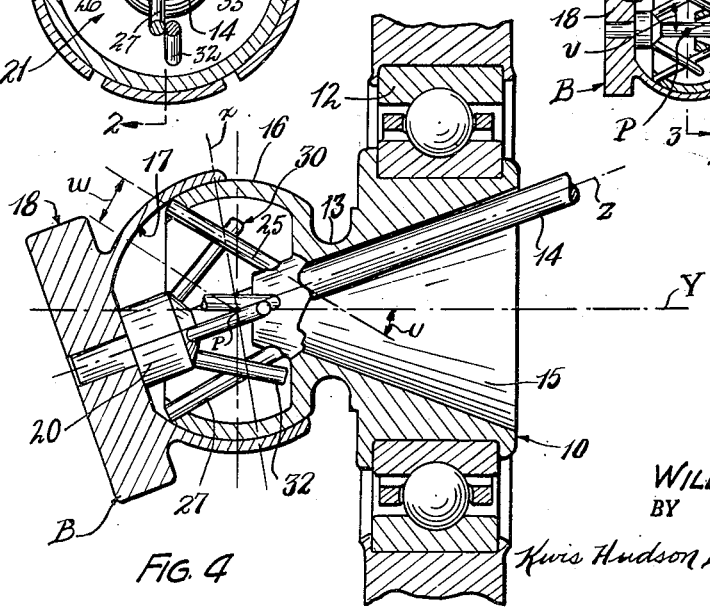
Fig. 4 is an enlarged view similar to Fig. 2 showing the parts in a different operating position.
Figure 5:
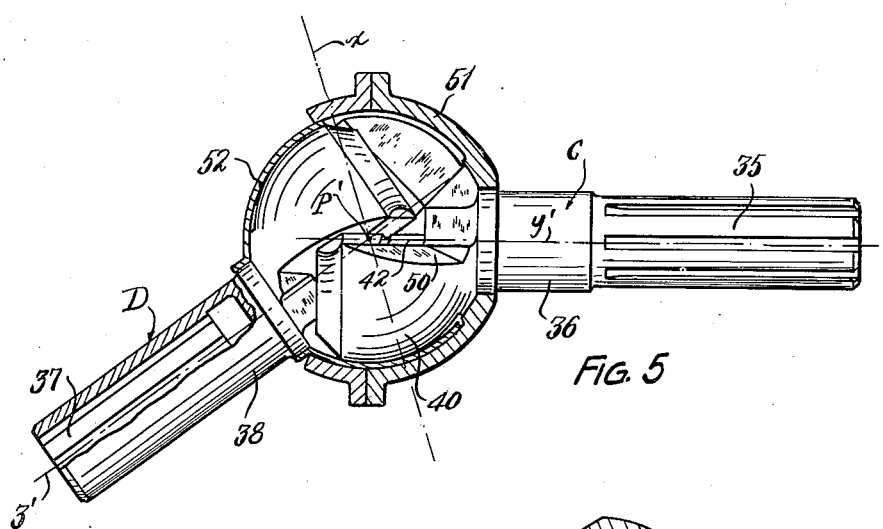
Fig. 5 is a side elevational view, with portions broken away and in section, of a universal joint embodying the present invention.
Figure 10:
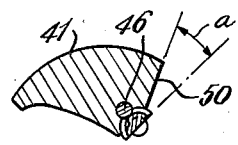
Fig. 10 is a fragmentary sectional view, with portions in elevation, on the line 10—10 of Fig. 6.
Figure 9:
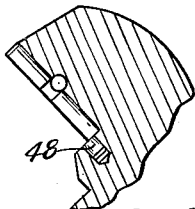
Fig. 9 is a fragmentary sectional view, with portions in elevation, on the line 9—9 of Fig. 6.
Figure 7:
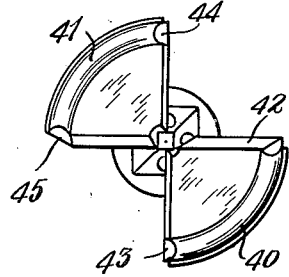
Fig. 7 is an end view of Fig. 6 looking from the left.
Figure 6:
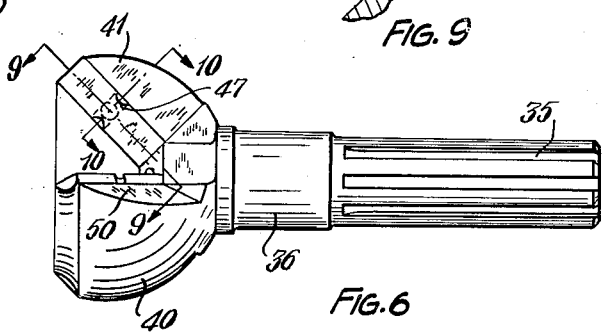
Fig. 6 is an elevational view of a portion of the universal joint shown in Fig. 5.
Figure 8:
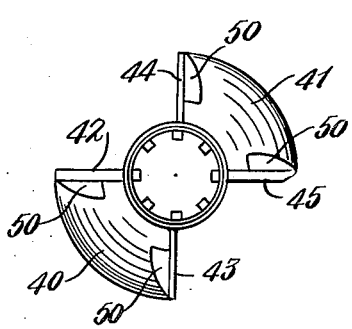
Fig. 8 is an end view of Fig. 6 looking from the right.

In the embodiment shown, the shaft 14 projects from the joint proper to the rear or right through assembly A and the conical surface of the aperture 15 through which the shaft extends forms an angle of 20° with the axis of rotation of assembly A and has its apex to the left of the center $p$ of the spherical surfaces 16, 17 a sufficient distance to provide for the thickness of the shaft 14, thus permitting a deflection of 20° between the axes of rotation of the assemblies A, B, see Fig. 4. The portion of the shaft 14 to the right or rear of the collar 20 can be eliminated and the shaft extended to the left any required amount, similar to the construction shown in Fig. 5, in which event the aperture 15 can be omitted and the member 10 of assembly A to the right or rear of the spherical surface or ball 16 changed to a shaft of any desired size.

In the embodiment shown in Figs. 1 to 4, the pins 25 to 28 of assembly A are in point contact with pins 30 to 33 of assembly B, which point contact limits the load or torque which can be transmitted by the universal joint, however, it has the advantage that it is both simple in construction and permits relative motion of the pins with respect to each other about their longitudinal axes, that is, the pins can readily rock about each other, which motion is necessary when the axes of the assemblies are other than coextensive. Where it is desired to transmit loads heavier than those permissible by the construction shown in Figs. 1 to 4, surface contact between the driving and driven members of the assemblies can be employed but, in this event, provision must be made for the contacting members to rock in their supports or carriers.

An embodiment of the invention employing contacting areas between the driven and driving assemblies of the universal joint is shown in Figs. 5 to 10, inclusive, and other embodiments will readily suggest themselves to those skilled in the art to which the invention relates. Referring to Figs. 5 to 8 of the drawings, the universal joint shown therein comprises two assemblies C and D, either of which may be the driven assembly or member. The assemblies C, D are identical in construction except for the housings, hereinafter referred to, and the means shown for connecting the universal joint in a power transmission system. As shown, the assembly C is adapted to be connected in a power transmission system by an externally splined shank 35 of a shaft or member 36 whereas the assembly D is adapted to be connected in the transmission system by an internally splined shank 37 of a shaft or member 38. Insofar as the present invention is concerned, the particular way in which the universal joint is connected in the power transmission system is immaterial and any suitable method may be employed. In the embodiment shown, the universal joint is adapted to be supported by rotatably supporting the member 36 in a suitable support, not shown. Alternatively, the member 38 can be rotatably supported in a fixed support, if desired. Since both of the members 36, 38 are identical except for the differences mentioned, only the member 36 is herein shown and described in detail.

The shaft or member 36 comprises two transversely projecting spherical, wedge-like portions 40, 41 located 180° apart and formed integral with the shank portion 35. The members 40, 41 are each substantially half quadrants of a thick-walled, hollow sphere and have semi-spherical, pin-like members 42, 43 and 44, 45, respectively, at opposite sides thereof and rotatable relative thereto about axes making equal angles preferably of about 25° to 50° with the axis of rotation of the member 36. As shown, the members 42 to 45 are rotatably supported in suitable semi-circular grooves formed in the side faces of the half quadrant-like portions 40, 41, with the axes of rotation of the members 42, 45 and 43, 44 lying in planes at right angles to each other, as clearly shown in Figs. 7 and 8. The semi-cylindrical pins 42 to 45 are retained against longitudinal movement in their respective grooves by balls 46 positioned in suitable apertures in the member 36, portions of which balls project into grooves 47 in the cylindrical surfaces of the semi-cylindrical pins approximately midway between their ends. As shown, the radially inner ends of the semi-cylindrical pin members are provided with shank portions 48 rotatably supported in suitable apertures in the member 36.

The approximately radial sides of the quadrant-like portions or members 40, 41 are cut away as indicated by the reference character 50 preferably on radial planes through the axes of rotation of the semi-cylindrical members located thereon in order to provide clearance for the engaging semi-cylindrical members of the cooperating assembly when the two parts of the joint are assembled. The angle a, which is preferably about 5° to 30°, see Fig. 10, determines the maximum deflection of the universal joint, however, this angle can be increased or decreased from that shown, as desired. The transverse cross-sectional shape of the grooves in which the semi-cylindrical members 42 to 45 are supported is approximately that of a 100° to 170° segment of a circle, from which it follows that the semi-cylindrical members are preferably capable of rocking from approximately 10° to 80°. The universal joint of the present invention will only operate for deflection angle between the respective assemblies of about 45° or less and, where deflection angles are referred to herein, including the claims, an appreciable or substantial maximum angle is meant but not one exceeding that mentioned above. When the two assemblies C and D are in operating position, the driving connection is effected through the contacting surfaces of the semi-cylindrical, pin-like members and the intersections of the longitudinal axis of the pins are equally spaced from the intersection $p'$ of the axis of rotation $y'$, $z'$ of the assemblies C, D, respectively, and always lie in a plane bisecting the angle between the axes of the assemblies, thus fulfilling the requirements for constant velocity transmission. Any pair of the driving surfaces in contact with each other always lie in a plane formed by the intersection of the longitudinal axes of pins or members upon which they are located and a line connecting the points of intersection of their longitudinal axes with the axes of rotation of the respective assemblies of which they form a part. This plane is always perpendicular to the plane bisecting the angle between the axes of the assemblies no matter what radial position the pins assume, and revolves about an imaginary axis through the points of intersection of the longitudinal axes of the pins with the axes of rotation of the assemblies.

While the contacting members shown are semi-cylindrical pin-like members it will be apparent that members of any suitable shape may be employed. For example, the contact members may be semi-spherical in shape etc. It is also to be understood that any desired number of contacting members may be employed in either of the embodiments shown.

In the embodiment shown, the assemblies C, D are normally retained in assembled position by a two-part, external, socket-like housing member 51 connected to the shank of the member 36 and an internal, ball-like housing member 52 connected to the shank of the member 38. The external housing 51 is comparatively rigid as is the housing member 52 and is made in two parts so as to permit assembly and disassembly of the universal joint and the two parts thereof may be detachably secured together in any suitable manner. The housings 51, 52 not only retain the members 36, 38 in assembled relation but form an enclosure for the operating parts of the universal joint. If desired, the members 36, 38 may be unenclosed or other means may be employed either as a substitute for the shield shown or as a supplement thereto.

From the foregoing description of the preferred embodiment of the invention, it will be apparent that the objects heretofore enumerated and others have been accomplished and that there has been provided a novel and improved constant velocity, universal joint which is simple and rugged in construction and reliable in operation. While the preferred embodiments have been described in considerable detail, the invention is not limited to the particular constructions shown and it is my intention to hereby cover all adaptations, modifications and uses thereof which come within the practice of those skilled in the art to which the invention relates and within the spirit and scope of the appended claims.

Having thus described my invention, what I claim is:

1. A universal joint comprising two rotatable assemblies adapted to be supported in driving relationship for substantial angular movement with respect to each other, each of said assemblies comprising pin-like members having their longitudinal axes in fixed acute angular relationships with respect to the axis of rotation of the assembly of which they are a part, one pair of said pin-like members being located between and in sliding engagement with a pair of the corresponding pin-like members of the other of said assemblies, said pin-like members of one of said assemblies being fixed at only one end.

2. A universal joint comprising rotatable assemblies supportable in driving relationship, said assemblies comprising shaft-like members having symmetrically arranged intermeshing power transmitting means projecting from adjacent ends thereof in fixed outwardly diverging acute angular relationship with reference to the axes of rotation of said respective assemblies of which they are a part thereby providing clearance underneath their outer ends to permit substantial angular movement of said assemblies relative to each other, said power transmitting means having cooperating pairs of convex surfaces at adjoining sides thereof in continuous sliding engagement with each other and in fixed outwardly diverging angular relationship with respect to the axis of rotation of said respective assemblies of which they form a part at an angle in the order of 25° to 50°.

3. A universal joint comprising rotatable assemblies supportable in driving relationship, said assemblies comprising shaft-like members having symmetrically arranged intermeshing power transmitting means projecting from adjacent ends thereof in fixed outwardly diverging acute angular relationship with reference to the axes of rotation of said respective assemblies of which they are a part thereby providing clearance underneath their outer ends to permit substantial angular movement of said assemblies relative to each other, said power transmitting means having cooperating pairs of arcuate surfaces at adjoining sides thereof in continuous sliding engagement with each other and in fixed outwardly diverging angular relationship with respect to the axis of rotation of said respective assemblies of which they form a part at an angle in the order of 25° to 50°.

4. A universal joint comprising rotatable assemblies supportable in driving relationship, said assemblies comprising shaft-like members having symmetrically arranged intermeshing power transmitting means projecting from adjacent ends thereof in fixed outwardly diverging acute angular relationship with reference to the axes of rotation of said respective assemblies of which they are a part thereby providing clearance underneath their outer ends to permit substantial angular movement of said assemblies relative to each other, each of said power transmitting means comprising a pair of elongated members arranged in fixed outwardly diverging angular relationship with respect to each other and the axis of rotation of said respective assemblies of which they form a part, said latter angle being in the order of 25° to 50°, and said adjoining elongated members having cooperating arcuate surfaces in continuous sliding engagement with each other.

5. A universal joint comprising rotatable assemblies supportable in driving relationship, said assemblies comprising shaft-like members having symmetrically arranged intermeshing power transmitting means projecting from adjacent ends thereof in fixed outwardly diverging acute angular relationship with reference to the axes of rotation of said respective assemblies of which they are a part thereby providing clearance underneath their outer ends to permit substantial angular movement of said assemblies relative to each other, each of said power transmitting means comprising a pair of elongated round pins arranged in fixed outwardly diverging angular relationship with respect to each other and to the axis of rotation of said respective assemblies of which they form a part, said latter angle being in the order of 25° to 50°, each adjoining pair of said pins being in continuous sliding engagement with each other.

WILLIAM F. SINDELAR.

REFERENCES CITED

The following references are of record in the file of this patent:

UNITED STATES PATENTS

| Number | Name | Date |
|---|---|---|
| 125,880 | Clemens | Apr. 23, 1872 |
| 308,355 | Gleason | Nov. 25, 1884 |
| 960,061 | Baaden | May 31, 1910 |
| 1,440,648 | Thiemer | Jan. 2, 1923 |
| 2,137,179 | Nelson | Nov. 15, 1938 |

FOREIGN PATENTS

| Number | Country | Date |
|---|---|---|
| 12,697 | Great Britain | 1889 |